United States Patent [19]

Okudaira et al.

[11] Patent Number: 4,652,931
[45] Date of Patent: Mar. 24, 1987

[54] OPTICAL SYSTEM FOR TTL AUTOMATIC FOCUSING VIDEO CAMERA

[75] Inventors: Sadao Okudaira; Yoshihiro Hama; Shinji Urata, all of Tokyo, Japan

[73] Assignee: Asahi Kogaku Kogyo Kabushiki Kaisha, Tokyo, Japan

[21] Appl. No.: 673,453

[22] Filed: Nov. 21, 1984

[30] Foreign Application Priority Data

Dec. 29, 1983 [JP] Japan .................. 58-248994

[51] Int. Cl.⁴ .......................... G03B 3/00; G03B 13/18
[52] U.S. Cl. .............................. 358/227; 358/225; 354/406; 250/201
[58] Field of Search ............ 358/227, 225, 228, 55; 354/400, 406, 407, 408, 402, 479; 352/140; 356/5; 250/201, 201 AF, 201 DF, 201 PF, 578

[56] References Cited

U.S. PATENT DOCUMENTS

| | | | |
|---|---|---|---|
| 4,148,584 | 4/1979 | Roelants | 356/5 |
| 4,197,006 | 4/1980 | Maillet | 356/5 |
| 4,272,684 | 6/1981 | Seachman | |
| 4,336,997 | 6/1982 | Röss et al. | 250/201 AF |
| 4,435,079 | 3/1984 | Hennick | 250/201 AF |

OTHER PUBLICATIONS

Johnathan Maxwell, "Monographs on Applied Optics #6–Catadioptric Imaging Systems", Adam Hilger, Ltd. (1972).

Primary Examiner—Gene Z. Rubinson
Assistant Examiner—Stephen Brinich
Attorney, Agent, or Firm—Sughrue, Mion, Zinn, Macpeak, and Seas

[57] ABSTRACT

An optical system for a TTL automatic focusing video camera in which a beam splitter employed in the optical system is formed of at least two totally reflecting surfaces disposed on opposite sides of an optical axis of a main image pickup lens forming an angle with respect thereto of 90° in the lateral direction and 45° in the longitudinal direction., An abberation correction lens is arranged on opposite sides of the optical axis form the main image pickup lens. A light beam reflected and converged by a totally reflecting surface provided at a rear of the aberration correction lens is allowed to pass by the totally reflecting surfaces of the beam splitter to reach the automatic focusing sensor.

5 Claims, 6 Drawing Figures

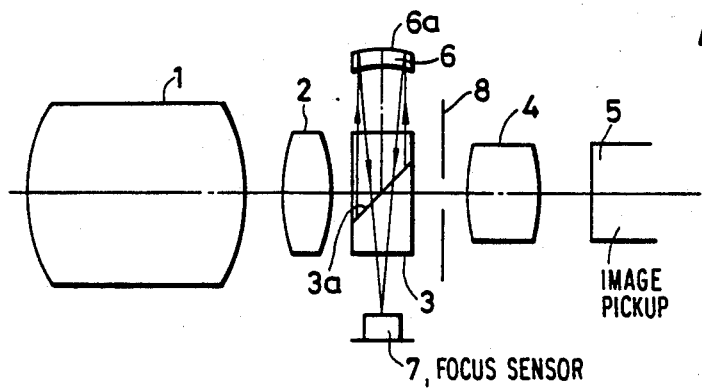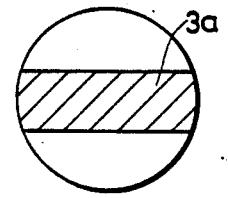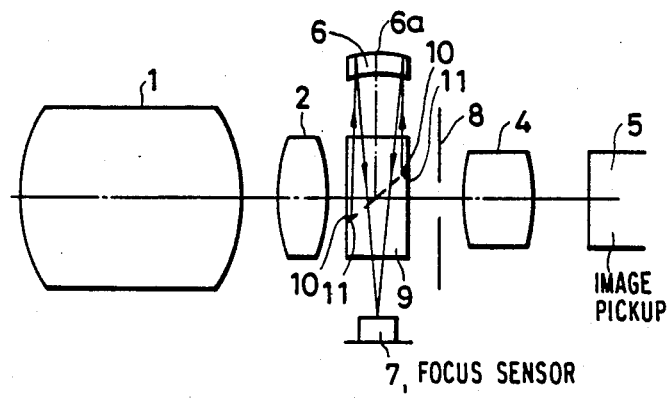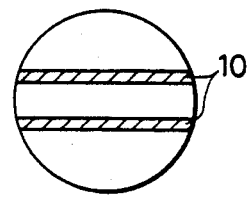

FIG. 3
FIG. 4
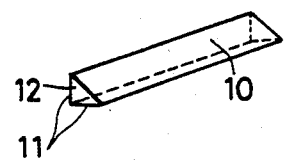
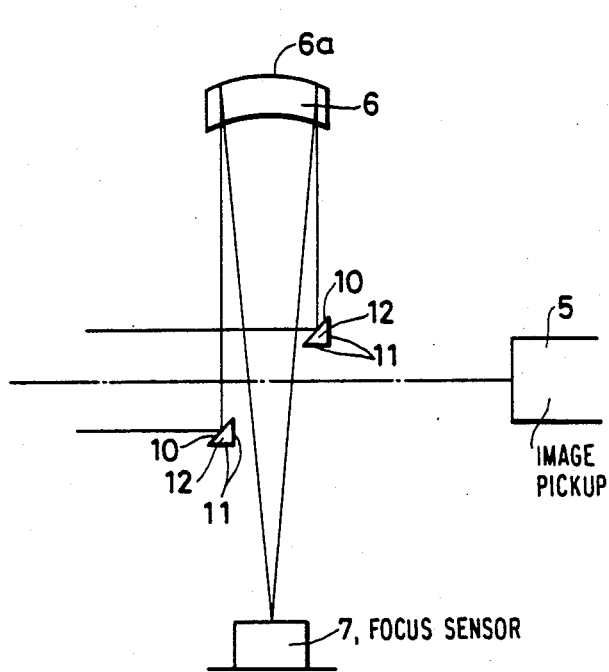

OPTICAL SYSTEM FOR TTL AUTOMATIC FOCUSING VIDEO CAMERA

BACKGROUND OF THE INVENTION

The present invention relates to an optical system for a video camera employing a TTL (Through The Lens) automatic focusing device. In a conventional video camera with a TTL automatic focusing device, a light beam passing through a main image pickup lens is divided into two parts by a beam splitter. One of the divided light beams is applied to an image pickup element while the other is applied to an automatic focusing sensor. Heretofore, the beam splitter usually employed has been a half-silvered mirror. In general, in order to increase the accuracy of automatic focusing (i.e., the sensitivity to defocusing) it has been the practice to increase the focal length of a relay lens system for the automatic focusing sensor with respect to the relay lens system of the main image pickup lens. In the conventional automatic focusing device, a mirror is disposed on the optical path, after the position where beam splitting is carried out, to deflect the light beam, thereby to ensure the optical path length of the light beam needed for automatic focusing control. Accordingly, the conventional automatic focusing device is necessarily bulky and costly both in terms of components and maintenance.

In order to eliminate the above-described difficulties, the present applicant has proposed a TTL automatic focusing distance-measuring optical system in which a light beam used for automatic focusing provided by means of a half-silvered mirror type beam splitter is reflected by a mirror so as to cause it to pass through the beam splitter again to thereby reduce the optical path length, achieving both miniaturization and a reduction in the number of components.

FIGS. 1A and 1B are a side view and a front view, respectively, showing this conventional optical system for a TTL automatic focusing video camera. In the case of a zoom lens, a light beam passed through a lens group 1 passes through a relay lens 2, and is then split into an image pickup beam and an automatic focusing control beam by a glass block 3 having a half-silvered surface 3a. The image pickup beam passes through a relay lens 4 to reach an image pickup element 5. The automatic focusing control beam is applied to an aberration correction lens 6, used for the automatic focus sensor, whose rear surface 6a has a totally reflecting coating. The automatic focusing control beam is reflected and converged by the rear surface 6a, and is then applied through the glass block 3 to an automatic focusing sensor 7. In FIG. 1A, reference numeral 8 designates an aperture.

In the above-described conventional optical system, the light beam applied to the automatic focusing sensor 7 passes through the glass block 3 twice so that the length of the optical path is increased without increasing the dimensions of the optical system. However, in this case, because the light beam passes through the half-silvered surface 3a twice, the quantity of light incident upon the automatic focus sensor 7 is unavoidably decreased. The part of the light beam which reaches the image pickup element 5 is reflected by the glass surface of the element 5. This reflected light beam adversely affects the automatic focusing control when applied to the automatic focus sensor 7.

This optical system provides significant merits. However, it is still disadvantageous in that, as the light beam is passed through the half-silvered mirror type beam splitter twice, the quantity of light incident upon the automatic focusing sensor is decreased. Also, the automatic focusing sensor is adversely affected by stray light which is formed when the light beam is reflected by the glass surface of the image pickup element in the video camera.

SUMMARY OF THE INVENTION

Accordingly, an object of the present invention is to provide an optical system which is small in size, light in weight and low in manufacturing cost, and which can perfom TTL automatic focusing with a high accuracy.

In accordance with the above and other objects, the invention provides an optical system for a TTL automatic focusing video camera wherein a part of the image pickup light beam is deflected out of the optical axis by beam splitting means disposed in the optical path of a main image pickup lens and is then applied to an automatic focusing sensor through an aberration correction lens provided for the automatic focusing sensor and having a totally reflecting surface at a rear surface thereof. The beam splitting means, in accordance with the invention, comprises totally reflecting surfaces disposed to form an angle of 90° with respect to an optical axis of the main image pickup lens in a lateral direction and 45° with respect to the optical axis in a longitudinal direction and arranged at a predetermined distance from the optical axis. The automatic focusing sensor and the aberration correction lens are arranged on opposite sides of the optical axis of the main image pickup lens. A light beam reflected and converged by the totally reflecting surface of the aberration correction lens passes by the totally reflecting surfaces of the beam splitting means to reach the automatic focusing sensor. An antireflection coating is preferably provided on the rears of the totally reflecting surfaces of the beam splitting means.

BRIEF DESCRIPTION OF THE DRAWINGS

FIGS. 1A and 1B are a side view and a front view, respectively, showing a conventional optical system in a TTL automatic focus video camera;

FIGS. 2A and 2B are a side view and a front view, respectively, showing a preferred embodiment of an optical system of invention;

FIG. 3 is a side view showing essential components of another embodiment of the invention; and FIG. 4 is a perspective view showing an example of a reflecting member used in the invention.

DESCRIPTION OF THE PREFERRED EMBODIMENTS

A preferred embodiment of an optical system for a TTL automatic focusing video camera will now be described.

FIGS. 2A and 2B are a side view and a front view, respectively, of an optical system for a TTL automatic focusing video camera according to the invention. In these figures, those components which have been previously described with reference to FIGS. 1A and 2B are designated by the same reference numerals.

In FIGS. 2A and 2B, a light beam passed through the lens group 1 passes through the relay lens 2, as a result of which the light beam becomes an afocal or substantially afocal beam before reching a glass block 9. The glass block 9 is formed as a rectangular glass block cut perpendicularly to the optical axis in the lateral direction and 45° with respect to the optical axis in the longitudinal direction to thus divide the block 9 into two parts. The two parts are joined together. The junction surface on the side of the object (i.e., the side of incidence of the light beam passed through the relay lens 2) are provided with totally reflecting surfaces 10 on both sides of the optical axis, spaced a predetermined distance from each other. An antireflection coating 11 is provided on the other junction surface behind the totally reflecting surfaces 10.

A part of the light beam applied to the glass block 9 is reflected by the pair of totally reflecting surfaces and is then applied to the aberration correction lens 6. The light beam thus applied is reflected and converged by the rear surfaces 6a of the lens 6 and is then applied to the glass block 9 again. In this case, the light beam applied to the glass block 9 passes through the gap between the totally reflecting surfaces 10 before reaching the automatic focusing sensor 7 because the surfaces 10 are arranged on both sides of the optical axis with a predetermined distance therebetween which allows the light beam reflected and converged by the rear surface 6a of the aberration correction lens 6 to pass through the glass block without being reflected by the totally reflecting surfaces 10 again.

A part of the light beam applied to the glass block 9 through the relay lens 2 reaches the image pickup element 5 without being reflected by the totally reflecting surfaces 10. A part of the light beam applied to the image pickup element 5 is reflected by the surface glass of the element 5 to return to the glass block 9. However, it will not reach the automatic focusing sensor 7 because the antireflection coating 11 is provided on the back of the totally reflecting surfaces 10. Accordingly, there is no adverse effect on the automatic focusing control.

FIG. 3 is a side view showing essential components of a second embodiment of the invention. In the second embodiment, instead of the glass block 9 used in the first embodiment, two reflecting members 12 are employed. Each reflecting member 12 is in the form of a prism made of metal, glass or plastic. One surface of the reflecting member 12 is a totally reflecting surface 10, and another surface is an antireflecting surface 11. The two reflecting members 12 are arranged on both sides of the optical axis with a predetermined distance therebetween.

In the second embodiment, because no glass block is used, the manufacturing cost is lower and the weight is also smaller than in the case of the first embodiment.

In the above-described two embodiments of the invention, two totally reflecting surfaces 10 are symmetrically arranged on both sides of the optical axis. However, depending on the quantity of light incident to the automatic focusing sensor 7 and the width of the totally reflecting surfaces 10, more than one pair of totally reflecting surfaces may be employed.

If the totally reflecting surfaces 10 are not symmetrically arranged on both sides of the optical axis, for instance, if one of the two totally reflecting surfaces 10 shown in FIGS. 2A and 2B is omitted, unfavorably, the quantity of marginal light is decreased asymmetrically in vertical direction. However, if the quantity of light incident to the automatic focusing sensor is otherwise overly small, the above-described method may be employed in some cases to advantage.

In the second embodiment shown in FIG. 3, the reflecting member 12 has the form of a triangular prism. However, the configuration thereof may also take the form of cylinder which is deformed to have a flat surface on one side, or one side of a polygonal prism may have the totally reflecting surface 10.

As is apparent from the above description, an automatic focusing device small in size, light in weight and low in manufacturing cost is provided according to the invention. Furthermore, the optical system provided by the invention is favorable both for the image pickup element and for the automatic focusing sensor.

We claim:

1. In an optical system for a TTL automatic focusing video camera, wherein a part of an image pickup light beam is deflected out of an optical axis by beam splitting means disposed in an optical path of a main image pickup lens and is applied to an automatic focusing sensor through a converging aberration correction lens provided for said automatic focusing sensor having a first curved totally reflecting surface as a rear surface thereof and a second curved surface as a front surface thereof, wherein the improvement comprises:

said beam splitting means comprising at least one second totally reflecting surface disposed to form an angle of 90° with respect to an optical axis of said main image pickup lens in a lateral direction and 45° with respect to said optical axis of said main image pickup lens in a longitudinal direction and arranged at a predetermined distance from said optical axis, said automatic focusing sensor and said aberration correction lens being arranged on opposite sides of said optical axis of said main image pickup lens, a light beam reflected and converged by said first totally reflecting surface of said aberration correction lens being allowed to pass by said at least one second totally reflecting surface to reach said automatic focusing sensor.

2. The improvement in an optical system for a TTL automatic focusing video camera as claimed in claim 1, further comprising antireflecting means provided at a rear of said at least one second totally reflecting surface.

3. The improvement in an optical system for a TTL automatic focusing video camera as claimed in claim 2, wherein said beam splitting means comprises a glass block having said at least one second totally reflecting surface disposed therein.

4. The improvement in an optical system for a TTL automatic focusing video camera as claimed in claim 2, wherein said beam splitting means comprises a pair of prisms having totally reflecting surfaces defining said second totally reflecting surface.

5. The improvement in an optical system for a TTL automatic focusing video camera as claimed in claim 1, wherein said beam splitting means comprises a plurality of second totally reflecting surfaces.

* * * * *